United States Patent
Dowedeit et al.

(10) Patent No.: US 7,529,654 B2
(45) Date of Patent: May 5, 2009

(54) SYSTEM AND PROCEDURE FOR CONTROLLING AND MONITORING PROGRAMS IN A COMPUTER NETWORK

(75) Inventors: Bernd Dowedeit, Holzgerlingen (DE); Roland Haibl, Kammlach (CH); Juergen Schneider, Althengstett (DE); Walter Schueppen, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1575 days.

(21) Appl. No.: 10/194,112

(22) Filed: Jul. 12, 2002

(65) Prior Publication Data

US 2003/0037137 A1 Feb. 20, 2003

Related U.S. Application Data

(63) Continuation-in-part of application No. 09/241,018, filed on Feb. 1, 1999, now abandoned.

(51) Int. Cl.
*G06F 17/50* (2006.01)
(52) U.S. Cl. .................................. 703/13; 703/21
(58) Field of Classification Search .................. 703/13, 703/21–22; 709/217
See application file for complete search history.

(56) References Cited

U.S. PATENT DOCUMENTS

| | | | |
|---|---|---|---|
| 5,163,131 A | 11/1992 | Row et al. | |
| 5,179,702 A | 1/1993 | Spix et al. | |
| 5,355,453 A | 10/1994 | Row et al. | |
| 5,442,791 A | 8/1995 | Wrabetz et al. | |
| 5,790,789 A | 8/1998 | Suarez | |
| 5,802,366 A | 9/1998 | Row et al. | |
| 5,941,947 A | 8/1999 | Brown et al. | |
| 6,049,775 A * | 4/2000 | Gertner et al. | 705/8 |
| 6,182,110 B1 | 1/2001 | Barroux | |
| 6,195,676 B1 | 2/2001 | Spiz et al. | |
| 6,253,368 B1 * | 6/2001 | Nelin et al. | 717/124 |
| 6,643,690 B2 * | 11/2003 | Duursma et al. | 709/217 |
| 6,658,465 B1 * | 12/2003 | Touboul | 709/223 |
| 6,782,424 B2 * | 8/2004 | Yodaiken | 709/224 |
| 2002/0188678 A1 * | 12/2002 | Edecker et al. | 709/204 |

* cited by examiner

*Primary Examiner*—Paul L Rodriguez
*Assistant Examiner*—Andre Pierre Louis
(74) *Attorney, Agent, or Firm*—Scully, Scott, Murphy & Presser, P.C.; Robert M. Trepp. Esq.

(57) ABSTRACT

A system and procedure for controlling and monitoring programs in a computer network system. An important advantage of the present invention is that a user interface for controlling and monitoring the programs in the computer network system remains unchanged when compared to the user interface of single computers. The computer network simulates a single computer. The system administrator controls and monitors the programs in the computer network system as in a single computer. The user interface is independent of the computer, i.e. the system administrator only needs to call one computer in the computer network system. The selection of the computer in the computer network system is carried out by automatic addressing. This computer is responsible for centralized control and monitoring in the whole computer network. The selection is made dynamically, i.e. other computers or several computers at the same time can take over the these central functions (dynamic centralization).

23 Claims, 10 Drawing Sheets

SYSTEM AND PROCEDURE FOR CONTROLLING AND MONITORING PROGRAMS IN A COMPUTER NETWORK

This patent application is a continuation-in-part application of parent patent application Ser. No. 09/241,018, filed Feb. 1, 1999 now abandoned.

BACKGROUND OF THE INVENTION

The invention presented describes a system and procedure for controlling and monitoring programs in a computer network.

PRIOR ART

Depending on the area of use, over one thousand application programs can run simultaneously on a mainframe computer such as the IBM S/390 within the operating system IBM OS/390. FIG. 1 shows such a mainframe computer with an operating system, a system management program and application programs A1-An. The large number of application programs means that control and monitoring by a system administrator is required. The system administrator is generally supported by a control program (system management program such as IBM SA OS/390) to control and monitor the application programs. The system management program starts and ends the application programs running on the mainframe and monitors the respective application programs to defined user specifications.

The IBM SA OS/390 program consists of a definition part and an execution part. In the definition part are defined the standard sequence processes such as which application should be started, in which system conditions an application is to be started or whether the active application fulfills the user specifications (monitoring). The system administrator defines the user specifications by means of an interactive language which is a component of the system management program. The defined user specifications are transferred to the execution part. The execution part communicates with the application programs of the mainframe or the behavior of the application program working with the operating system is analyzed. The information gained from this on the application programs is compared with the user specifications and, if a discrepancy is discovered, then the application program affected is corrected according to the user specifications.

Mainframe computers working using bipolar technology have very short switching times and, due to their high processing speed are particularly suited to the installation of many application programs. A serious disadvantage of these mainframes is the high cost of acquisition and cost-intensive maintenance. An alternative to bipolar computers can be found in CMOS computers which have longer switching times but are greatly cheaper to procure and maintain. In order to achieve similar processing speeds on CMOS computers, the CMOS computers are switched into a computer network.

However, an architecture is required here which allows application programs which previously only ran on one operating system to be distributed over several operating systems (several computers in the network). At IBM, this architecture is called Sysplex (system complex). Using Sysplex architecture, several computers based on CMOS technology are switched to form a computer network. The same operating system, for example IBM OS/390, and the same system management program runs on each computer. FIG. 2 shows such a computer network consisting of computers S1, S2 and S3 and the application programs A1, A2, A3 and A4. In this, the application program A1 is installed on all computers, application program A2 only on computers S1 and S2, application program A3 only on computer S1 and the application program A4 only on computer S3. Each computer has installed an operating system and a system management program such as IBM SA OS/390. The user interface shows each of computers S1-S3 as individual computers. The system administrator controls and manages each of computers S1-S3 in the computer network using its own user interface (for example an individual screen or several separate user windows for each computer). As the applications run simultaneously on several computers in the network, this results in the following problems from the point of view of the system administrator:

S/he has to manage n instances of the application. In this, each individual application instance, for example A1, A2, A3; A1, A2; A1, A4 must be explicitly addressed. The system administrator must access n times. Therefore s/he must know on which computer in the network the respective application instance is located. As mainframes, such as in banking, can have over 1000 application programs, access to a certain application instance is time-consuming. This applies in particular if the configuration of the computer network changes continually and the application programs in the network are reallocated.

The system administrator is no longer in a position to address the distributed application instances as a whole. Individual accesses to the respective application instance are continually required. This is time-consuming and can lead to incorrect inputs.

It is therefore the task of the invention presented to provide a procedure which guarantees the control and monitoring of programs in the network which were previously installed on individual computers, without the programs having to be changed and without the outlay for control and monitoring of the application programs on the computer network being greater than for individual computers.

SUMMARY OF THE INVENTION

The present invention is directed to a procedure for controlling and monitoring programs in a computer network where the computers are interconnected using a communication system and each computer has its own operating system and the programs run either simultaneously on all or on specially selected computers, characterized by the following steps:
  a) Creation of a user interface which simulates the computer network as being a single system
  b) Definition of application-specific functions for monitoring and controlling the programs
  c) Initialization of run-time functions for the control and monitoring of the programs under step b)
  d) Saving the data of the run-time functions on the computer or computers on which the program to be controlled is installed
  e) Activating the run-time functions on the computer or computers.

The present invention is further directed to a computer system for installation into a computer network containing at least one operating system and one or more programs, characterized by an additional program for the control and monitoring of programs with the following functions being installed on each computer:
  a) Function for creating a user interface which simulates the computer network as a single system
  b) Function for creating application-specific requirements for monitoring and controlling programs c) Function for initializing run-time functions for controlling and monitoring programs according to step b)
d) Function for saving data of the run-time functions on the computer or computers on which the program is installed
e) Function for saving references to programs which are not installed on the respective computer
f) Function for activating the run-time functions on the computer or computers
g) Function for selecting a computer for the central management of the computer network
h) Function for controlling the run-time functions on remote computers using remote procedure call technology.

An important advantage of the invention presented is that the user interface for controlling and monitoring the application program in the computer network does not have to be changed compared to the user interfaces of individual computers. The system administrator controls and monitors the application programs in the computer network as he would do for an individual computer. The user interface is independent of a computer, i.e. the system administrator only ever needs to select one computer in the computer network. Access to an individual application program is independent of the physical position of the application program on a computer. When making a request to an application program, several application instances can be addressed simultaneously.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Figure 1:
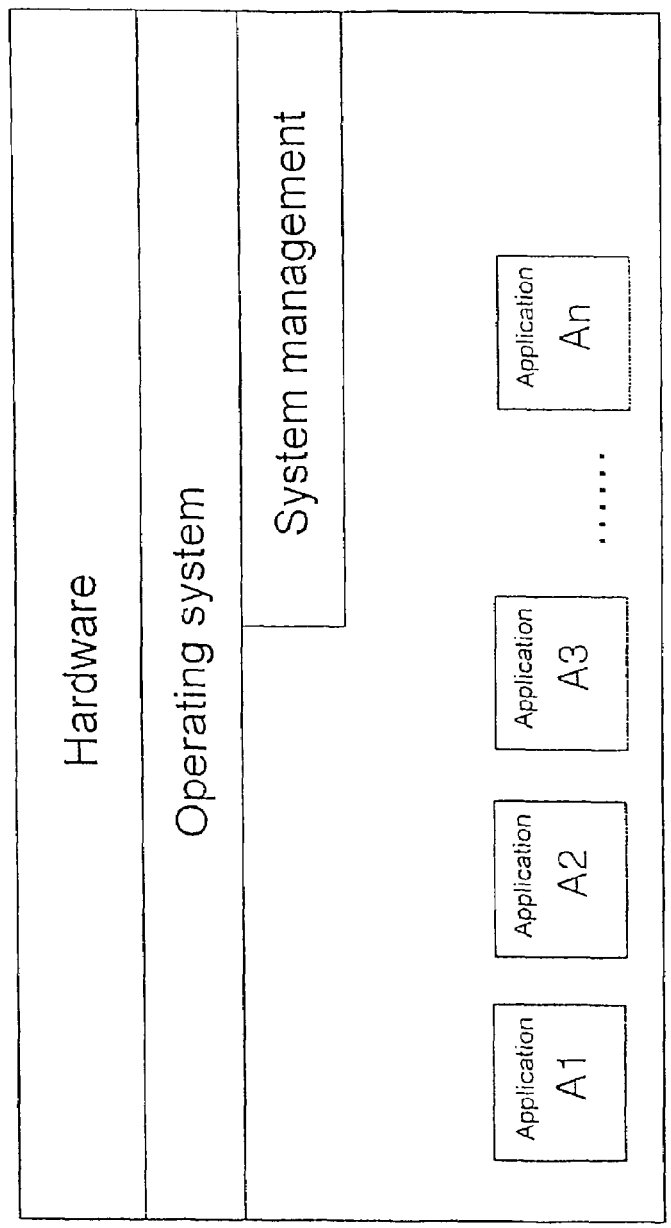
FIG. 1 shows a mainframe computer based on bipolar technology with n application programs with a user interface according to the state of the art.
Figure 2:
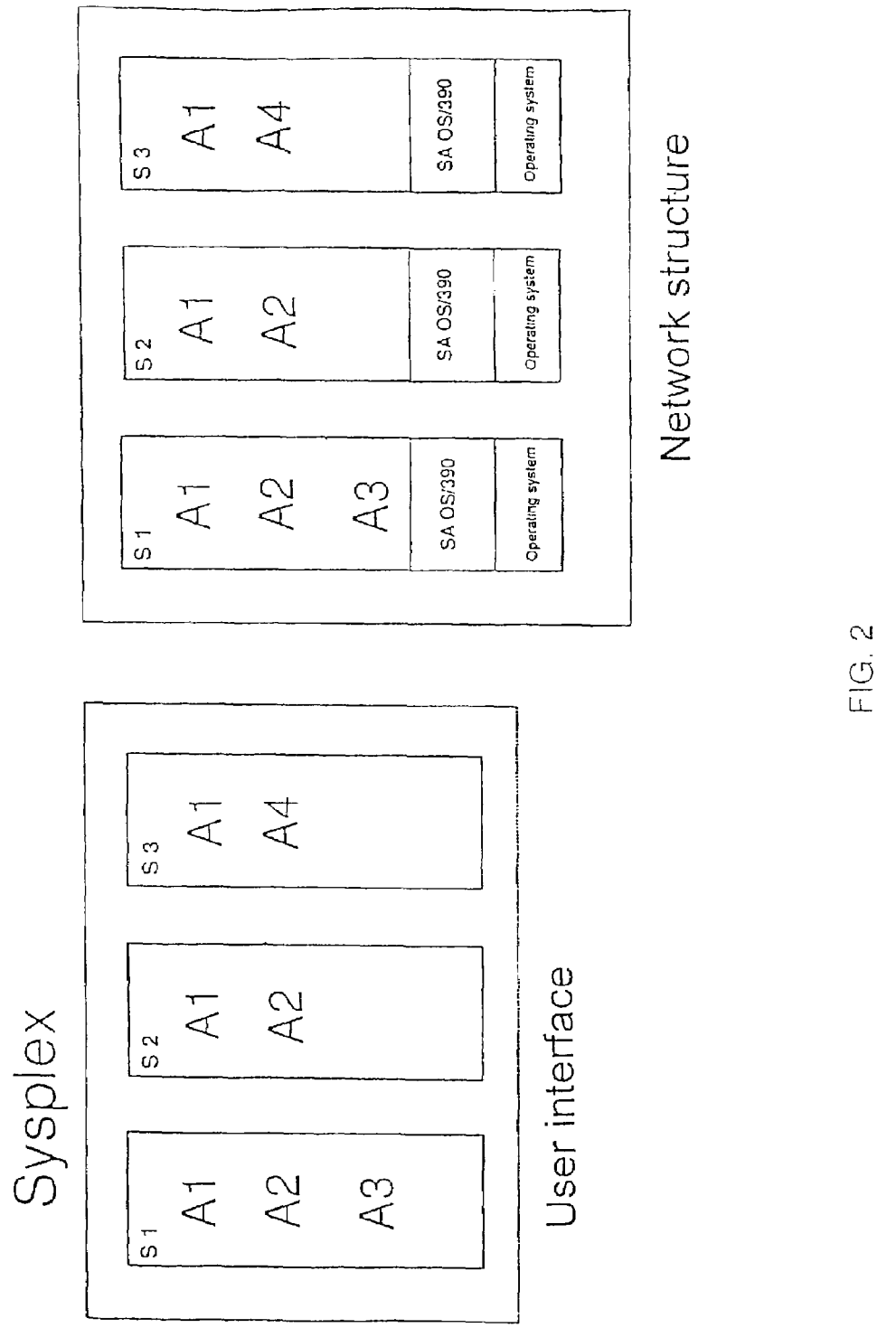
FIG. 2 shows a computer network based on CMOS technology with a user interface according to the current state of the art.
Figure 3:
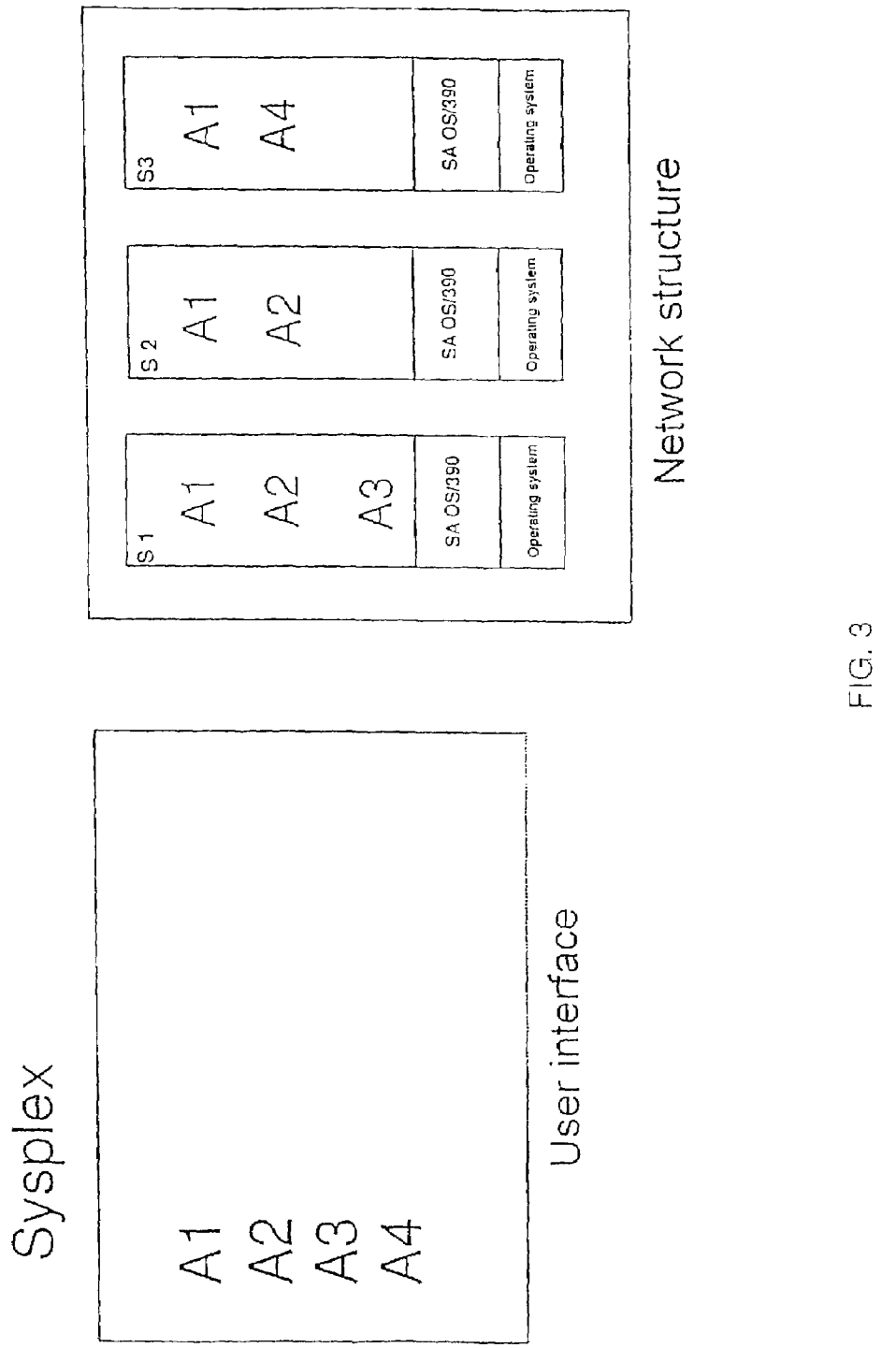
FIG. 3 shows a computer network according to FIG. 2 with the invention user interface.

FIG. 3 shows a computer network structure consisting of three computers S1, S2 and S3, each of which has its own operating system installed, for example IBM OS/390 or other operating systems and its own system management program, such as IBM SA OS/390. Applications A1, A2, A3 and A4 are distributed across the computer network in every possible combination. Which applications have to be installed and how often on which computers in the network is a question based on the desired throughput of the respective application. The computers are connected with one another using, for example, IBM Sysplex architecture. From the point of view of the system administrator, the computer network appears to be an individual computer and the monitoring and control of the respective application programs A1, A2, A3 and A4 is carried out no differently to on an individual computer, i.e. starting and ending and monitoring these applications occurs independent of the concrete installation and execution of the application on a particular computer.

The system administrator does not need any knowledge of the concrete installation on a particular computer. In this, the computer responsible for the addressed application is automatically informed and the necessary access is constructed. This function does not change the usual user interface as is normal on individual computers.

Figure 4:
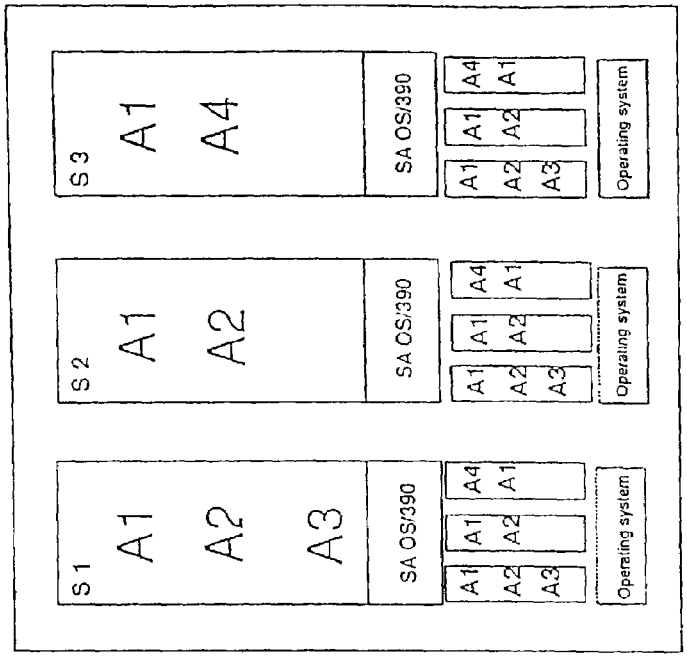
FIG. 4 shows a computer network according to FIG. 3 in an additional design form.
Figure 4:
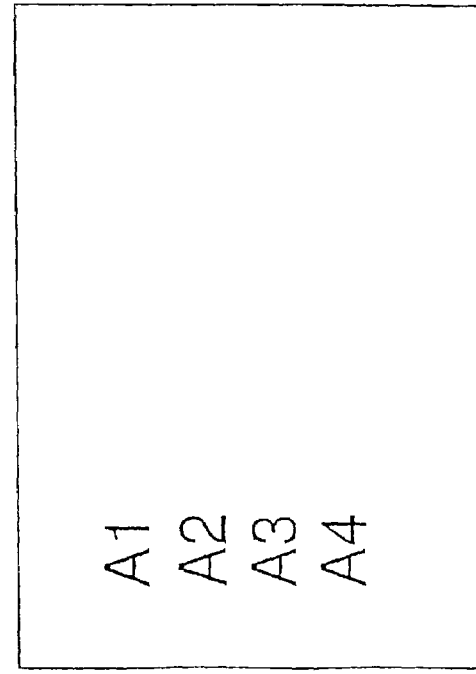

FIG. 4 shows a design form in which the automatic addressing of applications A1, A2, A3 and A4 can be executed.

Each computer S1, S2 and S3 of the computer network contains all necessary data structures on its own application programs and those of others during its run time. In this data structure is held all the information necessary for identifying the applications and to create the access to these applications. If a new computer enters the network, it informs all the computers which are already active of its applications and simultaneously receives information on the applications of the other computers.

If a computer is removed from the network, then its applications are deleted from the data structure of the other active computers.

The procedure for automatic addressing is neither visible nor controllable for the system administrator on the user interface.

The implementation presented ensures that if one or more computers fail, then the central control is maintained on the computers which are still active.

Figure 5:
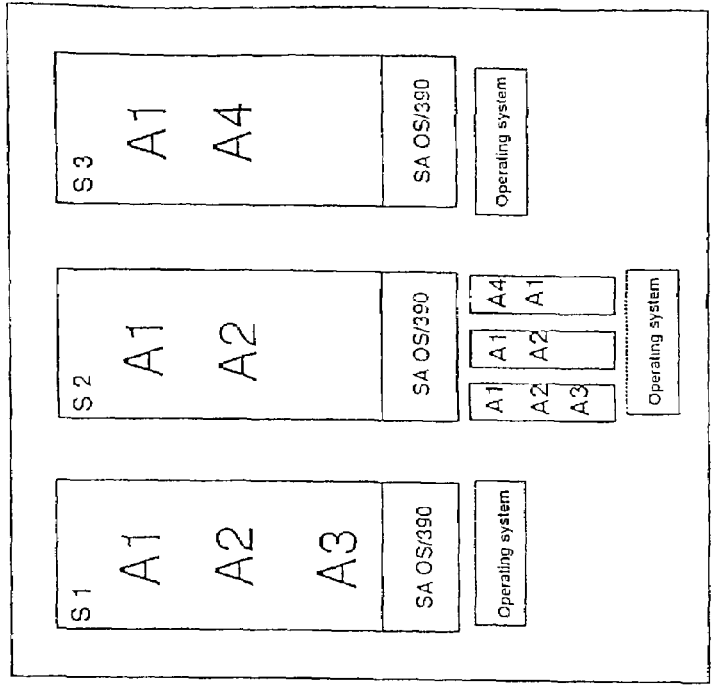
FIG. 5 shows a computer network according to FIG. 3 in an additional design form.
Figure 5:
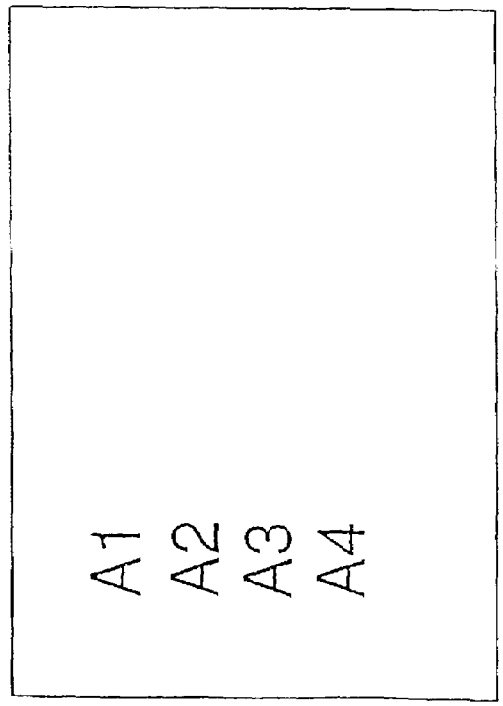

FIG. 5 describes an additional design form of the automatic addressing of an application. Here a computer (master computer) within the network receives an extracted function with regard to the addressing of applications. This master computer S2 contains all necessary data structures on its own and other application programs. All other computers or applications on this computer are addressed by the master computer. A disadvantage of this design form compared to the design form in FIG. 4 is that should the master computer fail, then it is no longer possible to address the applications. This can only be avoided if on the master computer failing, the transmission of existing data structures is triggered to an active computer. Another alternative is if the master computer fails, then the still active computers inform a new master computer and supply this new master computer with all necessary data with regard to the existing application programs.

Figure 6:
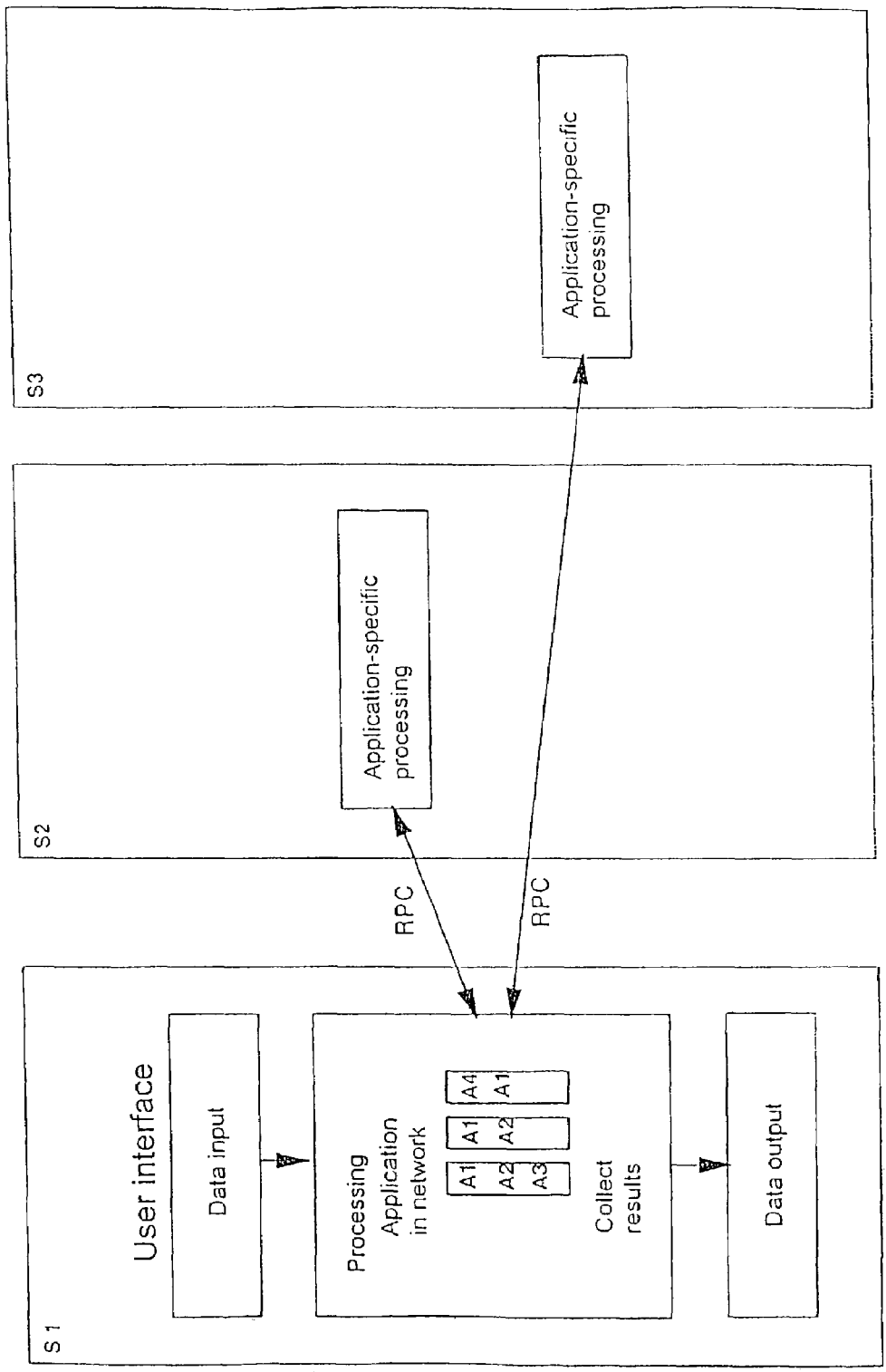
FIG. 6 shows the concrete implementation of the invention.

FIG. 6 describes the concrete implementation of the invention according to FIG. 3.

FIG. 6 shows a computer network consisting of the computer systems 1 to 3. Computer system 1 was selected by the system management program using automatic addressing. The system management program preferably consists of a user interface with data inputs and outputs and a processing part. Because the processing part is logically separated from the user interface, the processing functions necessary for the computer network do not have any influence on the user interface. The user interface simulates an individual computer for the system administrator. In FIG. 6, the computer system 1 is selected from the network as the central computer which takes over the control and monitoring of network applications. This selection is made dynamically, i.e. other computers or several computers simultaneously can also take over this function (dynamic centralization).

System management functions for controlling and monitoring a program must be executed on the computer on which the affected program is installed. In order to facilitate this, the system management functions are controlled using reference functions. This is done using a remote procedure call technique. The reference functions or the remote procedure calls are installed on each computer in the computer network.

FIGS. 7 through 10 illustrate a more detailed description of the present invention, especially on the generation of the data structures, the communication process for starting an application, and the registration process for new applications or systems, and present an overview of significant method steps involved in starting applications and registering applications or systems within a cluster (network).

Figure 7:
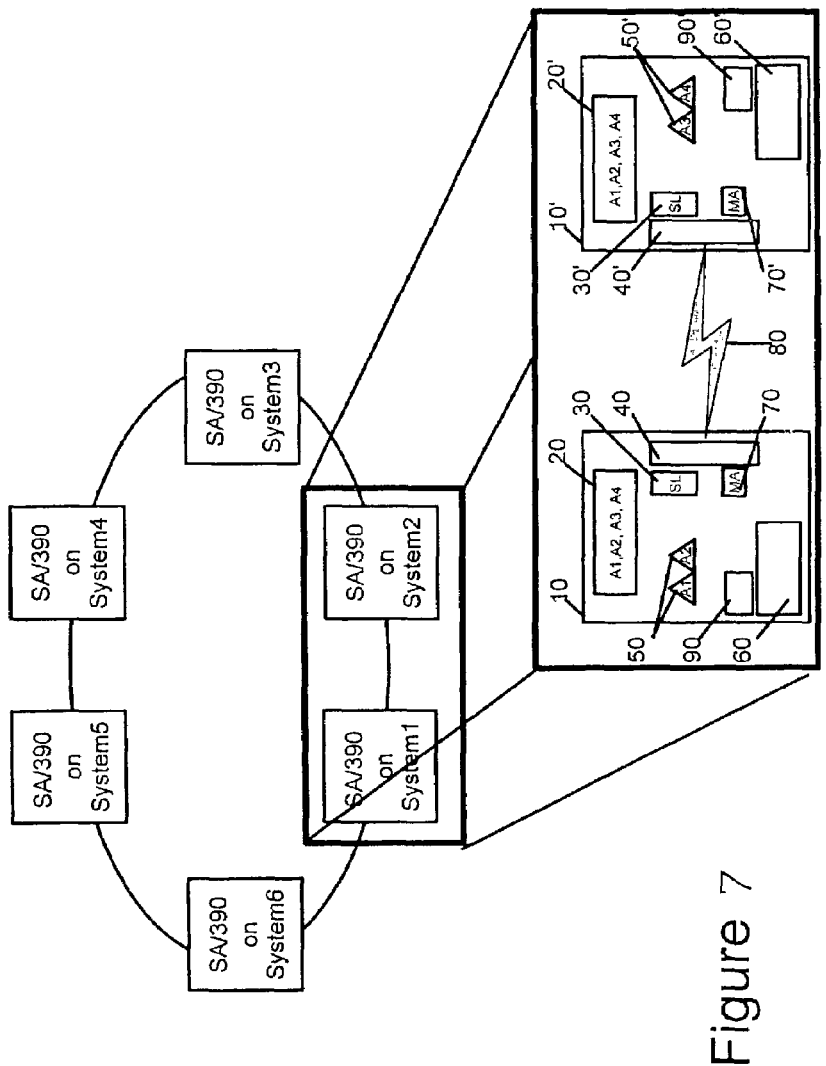
FIG. 7 illustrates a network architecture for peer to peer communication in a Sysplex group based upon IBM Sysplex architecture, with six independent systems 1-6, each having a system automation program SA for IBM's operating system S/390.

FIG. 7 illustrates a network architecture for peer to peer communication in a Sysplex group based upon IBM Sysplex architecture, with six independent systems 1-6, each having a system automation program SA for IBM's operating system S/390. All systems 1-6 are connected to each other using IBM's Sysplex Cluster technology. The bottom portion of FIG. 7 presents an expanded and more detailed illustration of systems 1 and 2.

Figure 8:
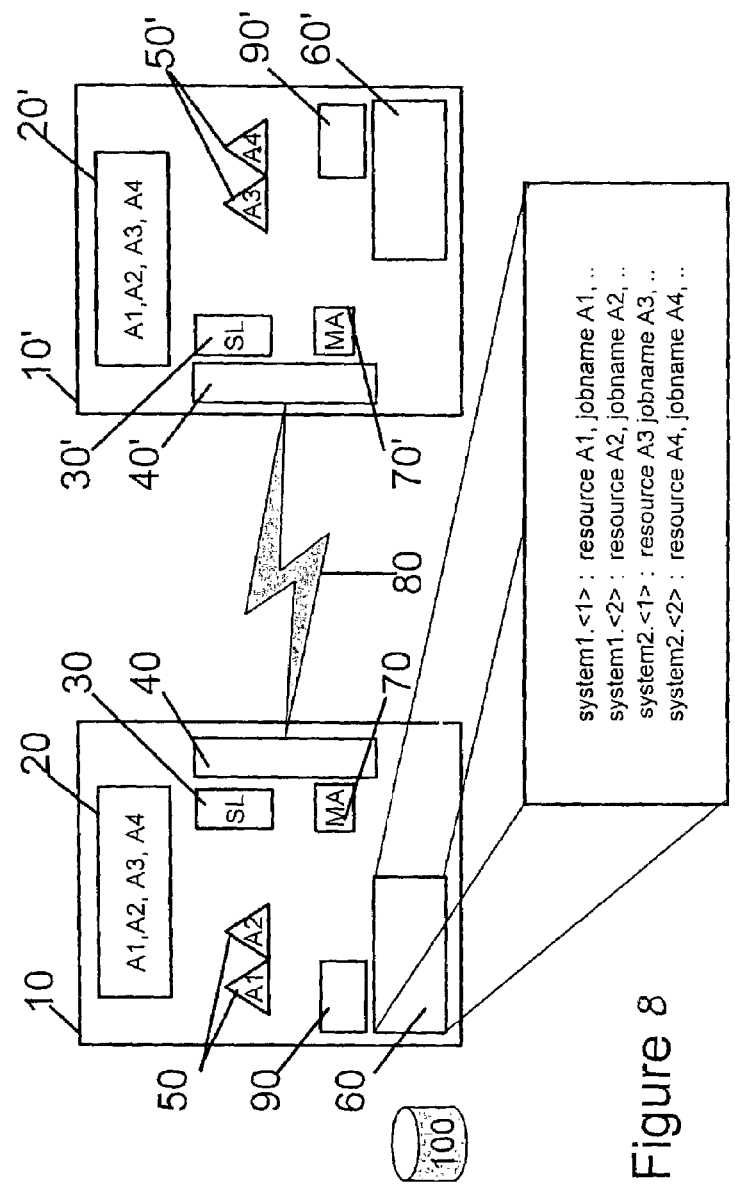
FIG. 8 corresponds to the bottom portion of FIG. 7 and illustrates only systems 1 and 2 of FIG. 7 with their inventive features for carrying out the present invention.

FIG. 8 corresponds to the bottom portion of FIG. 7 and illustrates only systems 1 and 2 of FIG. 7 with their inventive features for carrying out the present invention. All of the other systems 3-6 must also include the same inventive features.

FIG. 8 is a more detailed view of systems 1 and 2, and illustrates an expanded data structure in the form of a Table (printed below) which is presented in a simplified form, and indicates that system 1 has resource A1 with jobname A1 and resource A2 with jobname A2, and that system 2 has resource A3 with jobname A3 and resource A4 with jobname A4.

system 1.<1>: resource A1, jobname A1, . . .
system 1.<2>: resource A2, jobname A2, . . .
system 2.<1>: resource A3, jobname A3, . . .
system 2.<2>: resource A4, jobname A4, . . .

Each system, system 1 at 10 and system 2 at 10', comprises a user interface (GUI), 20 for system 1 and 20' for system 2, a slave 30, 30', a communication manager 40, 40', a local application 50 for system 1 (which includes applications A1, A2) and 50' for system 2 (which includes applications A3, A4), a data structure table 60, 60' (shown in more detail at the bottom of FIG. 8), a master 70, 70', with remote procedure calls (RPC) 80 being available for communications between systems 1 and 2, a system table 90, 90', and a configuration file (ACF) 100.

Each system includes a user interface 20 which displays all application A1-A4 independently of where they are installed in the network architecture. In the exemplary network architecture, applications A1-A4 are accessible, and are therefore shown in the user interface of each system 1-6. In system 1 applications A1 and A2 are physically installed, and in system 2 applications A3 and A4 are physically installed. Each system must contain all necessary data structures of its own physically installed applications and all other physically installed applications on each system belonging to the network architecture forming a cluster (network).

The data structure includes data for each of the applications within the cluster, wherein the data structure includes at least the application name and the address information for accessing that application within the cluster. The data within the data structure may be placed in a table 60 accessible by a master program 70.

The user declares one system of the cluster as a master system by calling the user interface of that system and starting application A3 within the cluster. The master program 70 of the master system 1 receives an input from the user interface 20, e.g. a user starts application A3, and accesses the table with data structure 60 for the applications, and reads the data for the selected application A3, e.g. address information for accessing application A3 in the cluster. Then, the master program 70 provides the address information for application A3 to the communication manager 40.

The fact that the master program is able to provide the address information for application A3 to the communication manager 40 can be termed 'automatic addressing'.

The communication manager 40 contacts the target system's communication manager 40' by a remote procedure call (RPC-80) to where applications A3 are physically installed, and invokes the slave programs 30' of the target systems which executes the start of the applications. The slave program 30' returns a response to the master program 70 of the originating system 1 (master system). The master program finally displays this response to the user at the user interface 20.

Figure 9:
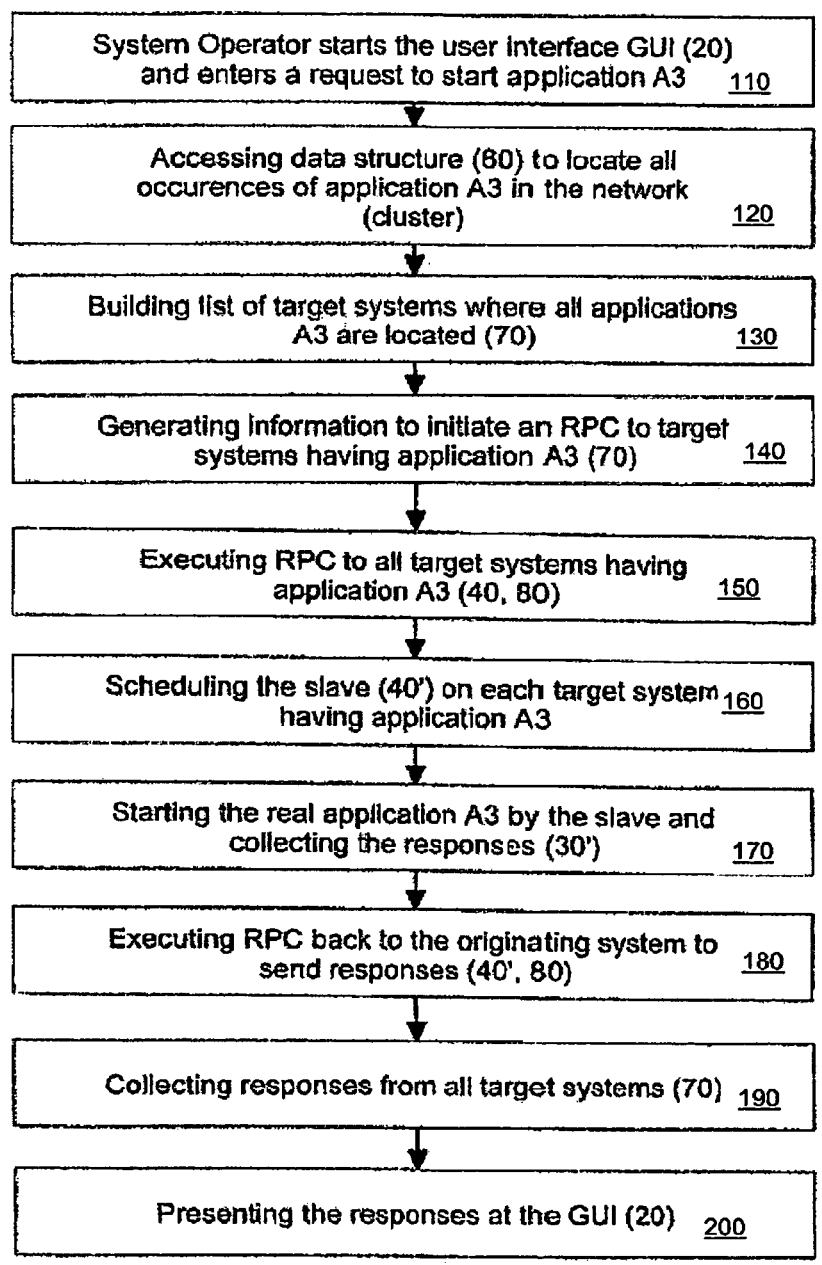
FIG. 9 illustrates the sequential steps of a procedure for controlling and monitoring programs in a computer system.

FIG. 9 illustrates the sequential steps of a procedure for controlling and monitoring programs in a computer system, wherein at step 110 a system operator starts the user interface GUI (20) and enters a request to start application A3. At step 120, the data structure (60) is accessed to locate all occurrences of application A3 in the network (cluster). At step 130, a list of target systems is compiled where all applications A3 are located (70). At step 140, information is generated to initiate an RPC to target systems having application A3 (70). At step 150, an RPC is executed to all target systems having application A3 (40, 80). At step 160, the slave (40') is scheduled on each target system having application A3. At step 170, the real application A3 is started by the slave and the responses (30') are collected. At step 180, an RPC is executed back to the originating system to send responses (40', 80). At step 190, the responses are collected from all target systems (70). At step 200, the responses are presented at the GUI (20).

Figure 10:
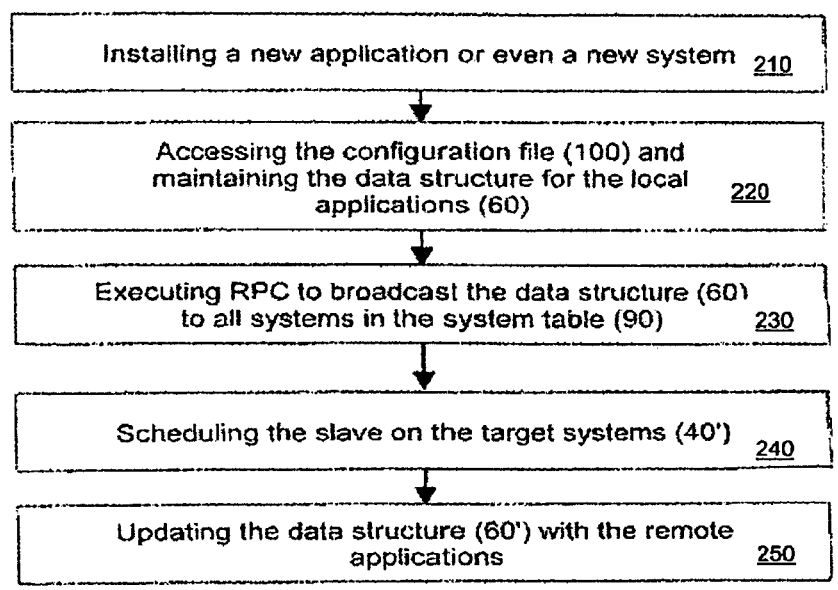
FIG. 10 illustrates details of a specific registration process for installing a new application or even a new system.

FIG. 10 illustrates details of a specific registration process for installing a new application or even a new system. Each system 1-6 has knowledge about its configuration through a configuration file 100 (shown in FIG. 8) which is read during a system initialization where all the system's applications are defined. The system's data structure is maintained by using the data from the configuration file 100. Furthermore, each system knows all other systems belonging to the same network (cluster) by the system table 90. Each update in the data structure is automatically forwarded to the systems contained in the system table by using the same communication infrastructure, e.g. master program, communication manager, remote procedure call (RPC), as for starting an application.

FIG. 10 illustrates the sequential steps involved in a registration procedure for installing a new application or even a new system at step 210. At step 220 the configuration file (100) is accessed and the data structure is maintained for the local applications (60). At step 230, an RPC is executed to broadcast the data structure (60) to all systems in the system table (90). At step 240, the slave is scheduled on the target systems (40'). At step 250, the data structure (60') is updated with the remote applications.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A procedure for controlling and monitoring programs in a computer network comprising a plurality of computers where the plurality of computers are interconnected using a communication system and each computer has its own operating system and the programs run either simultaneously on all or on specially selected ones of the plurality of computers, characterized by the following steps:
   a) creating a user interface which simulates the computer network as being a single system;
   b) defining application-specific functions for monitoring and controlling the programs;
   c) initializing run-time functions for control and monitoring of the programs under step b);
   d) saving data of the run-time functions on the computer or computers on which the program to be controlled is installed; and
   e) activating the run-time functions on the computer or computers.

2. The procedure according to claim 1, further comprising the step of providing the computer network from the group of a LAN network, an Intranet network and an Internet network.

3. The procedure according to claim 1, further comprising the step of providing the computer network comprised of computers with differing architectures.

4. The procedure according to claim 1, further comprising the step of installing different operating systems on the computers.

5. The procedure according to claim 1, further comprising the step of providing system management programs containing steps a-e on the computers.

6. The procedure according to claim 1, further comprising the step of providing the user interface under step a) representing the programs installed on the computers as icons or other objects which can be selected without representing the computer network.

7. The procedure according to claim 1, further comprising the step of creating the user interface by a system management program.

8. The procedure according to claim 1, further comprising the step of step b) being menu-controlled by using a system management program.

9. The procedure according to claim 1, further comprising the following additional step:
   initializing functions to define application-specific monitoring and control functions for programs in the computer network over the user interface by using a system management program.

10. The procedure according to claim 1, further comprising the step of initializing the run-time functions under step c) by a system management program.

11. The procedure according to claim 1, further comprising the step of providing a master computer within the computer network with all necessary reference data of the master computer's and other computer's programs which are addressed exclusively by the master computer.

12. The procedure according to claim 11, further comprising the step of transferring all reference data of the master computer's and other computer's programs to an active computer in the case of the master computer failing.

13. The procedure according to claim 1, further comprising the step of expanding step d) by additional references on the run-time functions for applications not installed in a respective computer.

14. The procedure according to claim 1, further comprising the step of a new computer entering the network informing all active computers of its applications and conversely the active computers informing the new computer of their applications.

15. The procedure according to claim 1, further comprising the step of activating the run-time function of a master computer which takes over central system management for the computer network.

16. The procedure according to claim 1, further comprising the step of providing each computer or several computers in the computer network with an ability to take over the central system management for the computer network in a dynamic centralization manner.

17. The procedure according to claim 1, further comprising the step of ascertaining which computer is to take over central system management by an automatic addressing procedure.

18. The procedure according to claim 1, further comprising the step of performing control of the run-time functions on remote computers by using a remote procedure call technique.

19. The procedure according to claim 1, further comprising the step of providing the programs from the group of application programs and service programs.

20. A computer system for installation into a computer network containing at least one operating system and one or more computer applications, the computer system characterized by a control and monitoring program for the control and monitoring of the one or more computer applications with the following functions being installed on each computer:
   a) a function for creating a user interface which simulates the computer network as a single system;
   b) a function for creating application-specific requirements for monitoring and controlling programs;
   c) a function for initializing run-time functions for controlling and monitoring programs according to b);
   d) a function for saving data of the run-time functions on the computer or computers on which the program is installed;
   e) a function for saving references to programs which are not installed on the respective computer;
   f) a function for activating the run-time functions on the computer or computers;
   g) a function for selecting a computer for central management of the computer network; and
   h) a function for controlling the run-time functions on remote computers using remote procedure call technology.

21. The computer system according to claim 20, including a communication system to interconnect the computers.

22. The computer system according to claim 21, wherein the program for controlling and monitoring the computer network is a part of one of the operating system and the communication system.

23. A program storage device readable by a machine, tangibly embodying a program of instructions executable by the machine to perform method steps for controlling and monitoring programs in a computer network comprising a plurality of computers where the plurality of computers are interconnected using a communication system and each computer has its own operating system and the programs run either simultaneously on all or on specially selected ones of the plurality of computers, characterized by the following steps:

a) creating a user interface which simulates the computer network as being a single system;

b) defining application-specific functions for monitoring and controlling the programs;

c) initializing run-time functions for control and monitoring of the programs under step b);

d) saving data of the run-time functions on the computer or computers on which the program to be controlled is installed; and e) activating the run-time functions on the computer or computers.

* * * * *